United States Patent [19]
De Filippis et al.

[11] Patent Number: 5,588,814
[45] Date of Patent: Dec. 31, 1996

[54] ELECTRONIC SWITCHING FAN ASSEMBLY FOR A VEHICLE

[75] Inventors: Pietro De Filippis, Monza; Ernesto Quartero; Alberto Petrone, both of Collegno, all of Italy

[73] Assignee: Bitron S.P.A., Italy

[21] Appl. No.: 439,360

[22] Filed: May 11, 1995

[30] Foreign Application Priority Data

May 12, 1994 [IT] Italy ................................. T094A0386

[51] Int. Cl.⁶ ................................................. F04B 35/04
[52] U.S. Cl. ................................ 417/423.7; 417/423.8; 417/423.12; 417/423.15
[58] Field of Search ........................... 417/364, 423.7, 417/423.8, 423.12, 423.14, 423.15, 424.2

[56] References Cited

U.S. PATENT DOCUMENTS

| | | | |
|---|---|---|---|
| 5,044,883 | 9/1991 | Neuder | 417/423.15 |
| 5,176,509 | 1/1993 | Schmider et al. | 417/423.7 |
| 5,217,353 | 6/1993 | De Filippis | 417/423.7 |

*Primary Examiner*—Charles G. Freay
*Attorney, Agent, or Firm*—Merchant, Gould, Smith, Edell, Welter, and Schmidt

[57] ABSTRACT

The electric fan assembly includes an electric motor composed of a rotor (11) having a fan wheel (12), and a stator (10) fitted with a card (50) supporting a printed circuit for determining operation of the motor. The stator includes a bearing (60) having two main opposite faces, a lower face and an upper face, for mounting the stator (10), defines a seat (62) for the assembly formed by the card (50) and a plurality of MOSs (54) projecting from the edges of the card, where the MOSs are coplanar to the card. The seat (62) has a depth dimensioned to receive a layer of solidifying resin covering and protecting the printed circuit and the relevant connections. The stator bearing (60) is axially crossed by channels (65) providing electric connection between the stator winding leads (30) and electric contacts (52) located on the card (50) proximate to an opening (51) obtained in the card at the channels (65). Axial fins (31) extend from the upper face of the stator bearing (60) for engaging the stator (10) axially and radially.

25 Claims, 9 Drawing Sheets

ELECTRONIC SWITCHING FAN ASSEMBLY FOR A VEHICLE

DESCRIPTION

The present invention relates to an electronic switching fan assembly for a vehicle compartment.

There are known electric fan assemblies in which the rotor consists of an iron cap to which the magnets are fixed. The rotor is attached to and rotates a fan wheel. The stator is mounted on a die-cast bearing having a bottom card with a printed circuit determining operation of the electric motor. The die-cast bearing supporting the stator, the rotor and the fan wheel is secured to an open box by means of rubber cylinders also known as silent blocks. The open box communicates with and draws air from a scroll being part of the air conditioning system of the vehicle, to which air is to be supplied. Generally, the fan wheel and the open box are so arranged as to let part of the air through the inside of the electric motor for cooling same.

The above securing system is not effective in dampening vibration generated by the electric motor in operation. At certain frequencies, vibration can cause resonance such that the user can hear noise or feel vibration to a degree that is not acceptable with the standards that are presently required with vehicles.

One of the objects of the present invention is to provide a securing system of the electric motor capable of preventing or at least reducing substantially transmission and amplification of vibration created by the electric motor.

Another problem encountered with electric motors is overheating. The motor is likely to deteriorate due to excessive heating of its components. In some cases it is stopped by some of the electronic protections which the driver circuit is provided with.

Accordingly, it is another object of the present invention to provide an electric fan assembly in which inner parts that are subject to overheating, particularly the stator and the metal oxide semiconductors (MOS), are cooled properly.

It is a further object of the present invention to improve environmental protection of the printed circuit controlling operation of the electric fan assembly. The printed circuit is inevitably located in an ambient in communication with the outside and therefore suffers from adverse ambient factors that are typical of applications on automobiles.

At present, the MOSs of the printed circuit are retained by elastic members pressing on the stator bearing through an interposed foil of electrically insulating but thermally conductive material, the shape of which is rather complex. Then, the MOSs are soldered to the printed circuit. This arrangement involves industrial and reliability drawbacks which render it not desirable with mass production such as that of automobile manufacturing.

It is a further object of the present invention to provide a more simple construction for the MOS and the printed circuit supporting card, thereby allowing simple and correct mounting of the card and the MOSs in advance soldered to the base of the stator bearing.

It is still a further object of the present invention to provide a simpler shape to the foils of electric insulating and thermally conductive material for the MOS.

A further object of the invention is to eliminate the conventional magnet containing iron cap and replace it with a rotor ring advantageously obtained by the same blanking operation used to form the stack of laminations for the stator.

Iron caps are usually fixed to the rotor shaft, while the rotational bushings for the shaft are secured to the bearing. This arrangement requires very accurate working to provide correct centering (and balancing) of the rotor relative to the stator. Therefore, a further object of the present invention is to provide an electric fan assembly wherein centering is made easy without the need of particularly accurate and expensive working.

In accordance with one aspect of the invention as claimed, these objects are accomplished by the provision of an electric fan assembly for a vehicle compartment, of the type comprising an electric motor composed of a rotor to which a fan wheel is secured for rotation and a stator consisting of a stack of laminations. The stator is mounted to a die-cast bearing fitted in a open box in communication with a scroll from which the fan wheel sucks the air to be sent to the vehicle compartment. The electric fan assembly is provided with a card with a printed circuit for determining operation of said motor. The electric fan assembly is characterized in that the stator bearing has two main opposite faces: the lower face, opposite to the upper face for mounting the stator, defines a seat for the assembly formed by the card and a plurality of MOS projecting from the edges of the card, said MOS being substantially coplanar to said card; said seat has a depth dimensioned to receive a layer of solidifying resin covering and protecting the printed circuit and the relevant connections. The stator bearing is axially crossed by a plurality of central channels providing electric connection between the stator winding leads and a plurality of electric contacts located on the card proximate to at least one opening obtained in said card at said channels. A plurality of axial fins extend from the upper face of the stator bearing for engaging the stator axially and radially.

In order that the present invention may be well understood there will now be described a preferred embodiment thereof, given by way of example, reference being made to the accompanying drawings, in which.

Figure 1:
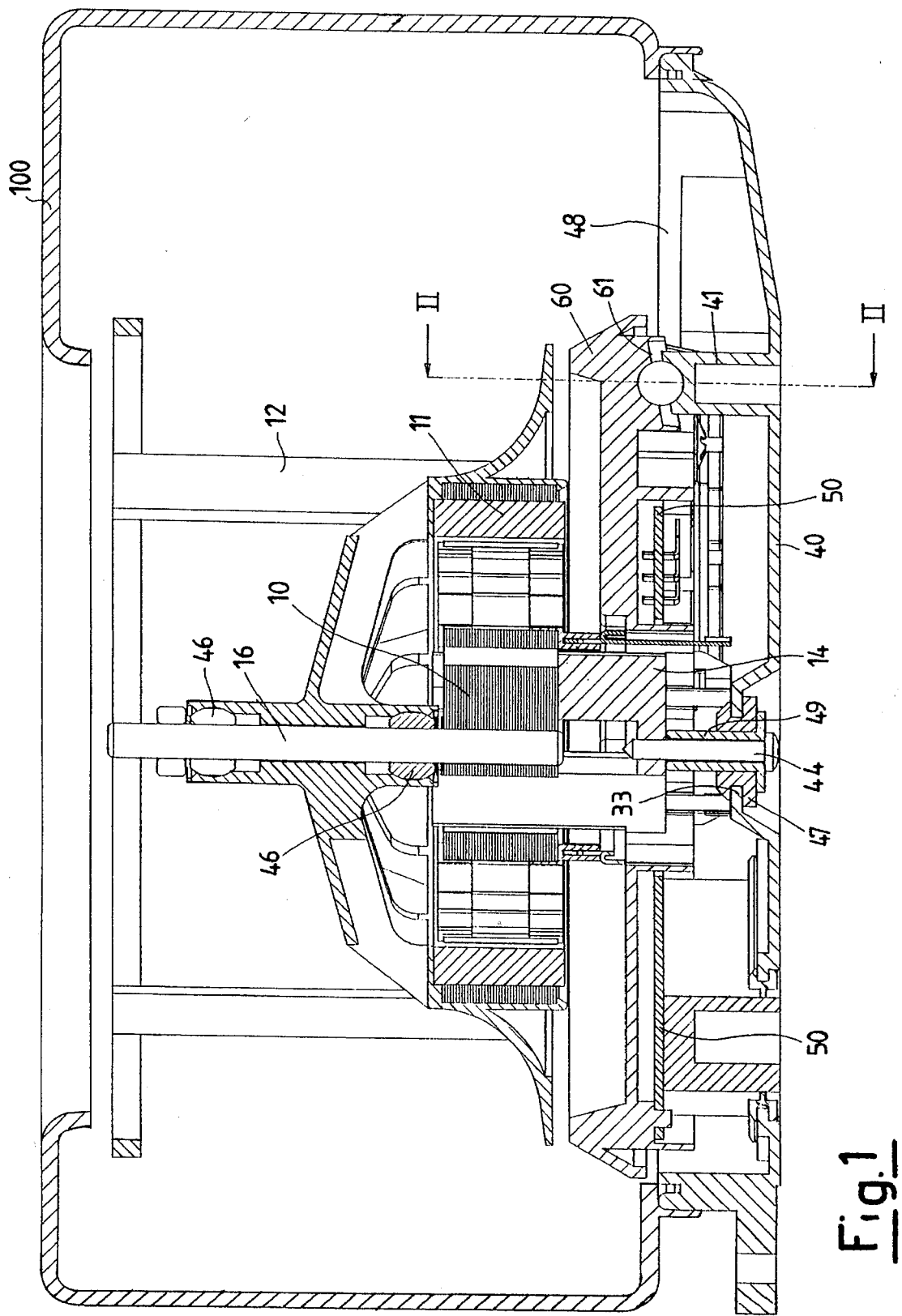
FIG. 1 is an axial cross-section of an electric fan assembly according to the present invention, where some parts are broken off for a better understanding.

With reference initially to FIG. 1, in summary, the electric fan assembly comprises an electric motor composed of a stator 10 and a rotor 11 to which a fan wheel 12 is secured for rotation. The stator 10 is formed by a stack of laminations determining axial slots for accommodating the windings. The stator is mounted on a die-cast end-shield bearing 60 having an bottom face to which a card 50 is fixed. Card 50 provides a printed circuit determining operational conditions of the electric motor. Bearing 60 is inserted in a half-shell in form of an open box 40 with a side opening 48 for connecting to a scroll 100. The fan wheel sucks air from the scroll 100 and delivers part of it to the vehicle compartment. The remainder of the air is used to cool the motor through opening 48 of half-shell 40 (FIG. 1).

Figure 3:
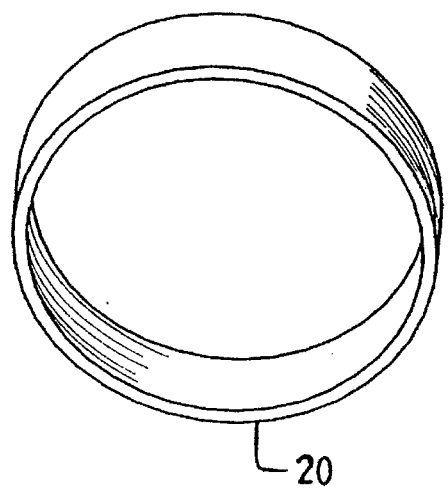
FIGS. 3 to 5 illustrate a rotor ring according to the invention, the relevant magnetized segments and a fan, respectively.

In order to describe in greater detail the various components of the electric fan assembly of the invention, the rotor 11 comprises an outer stator ring 20 (FIG. 3) formed by a plurality of stacked annular laminations, advantageously obtained from the peripheral portion of the same laminations forming the stator. More particularly, during construction each lamination is essentially blanked in three parts. The central and peripheral parts are used to form the stator 10 and the rotor ring 20, respectively, while the intermediate part (not shown for simplicity) is rejected. With this provision, a perfectly concentric rotor and stator are attained.

Figure 4:
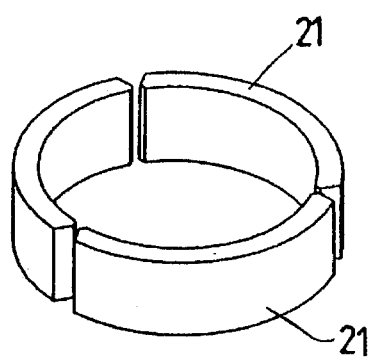

In FIG. 4 there are illustrated the magnetized segments 21 that are mounted to the inner lateral surface of the rotor ring 20. Segments 21 are circumferentially spaced by means of conventional elastic members (not shown) that are interposed between two segments urging them against the rotor ring 20. A film of glue can be applied to secure the segments on the rotor more firmly.

Figure 5:
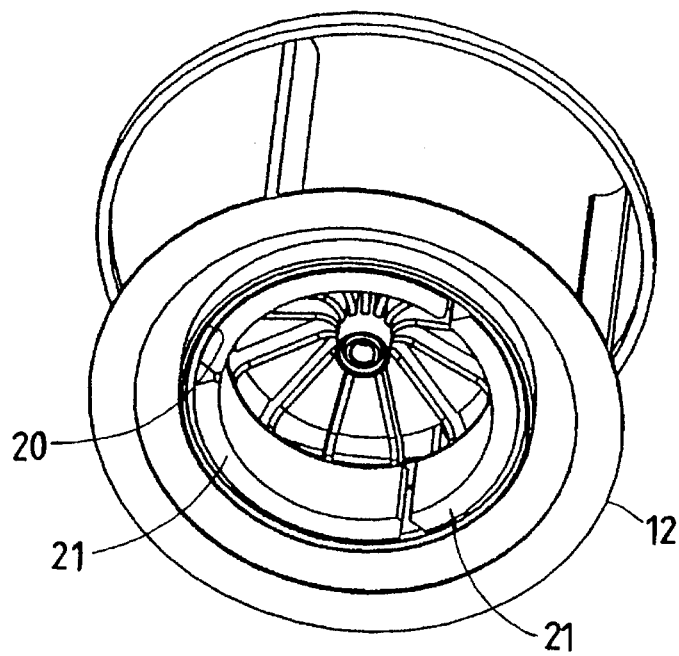
Figure 6:
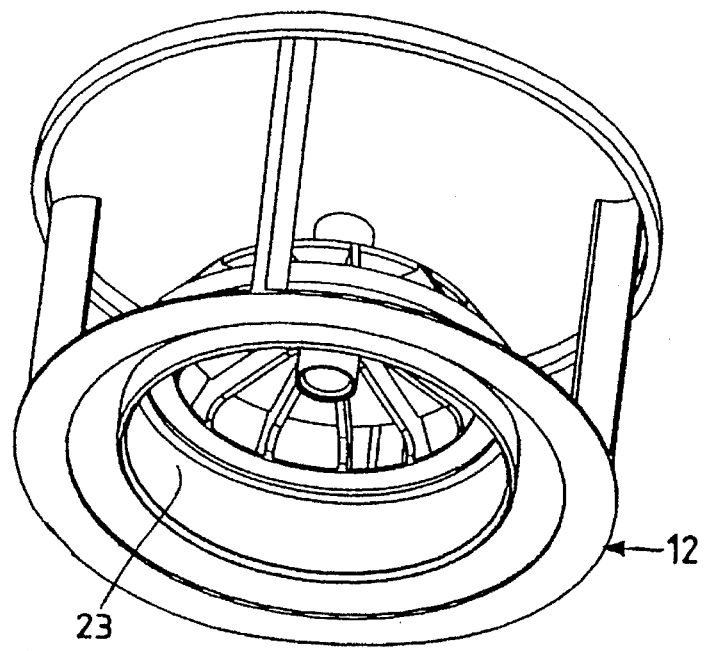
FIG. 6 depicts the mounted assembly of the components of FIGS. 3 to 5.

After mounting the magnets, the rotor ring 20 is housed in the lower cavity 23 (FIG. 5) of the fan wheel 12. FIG. 6 illustrates the complete fan wheel assembly.

Figure 7:
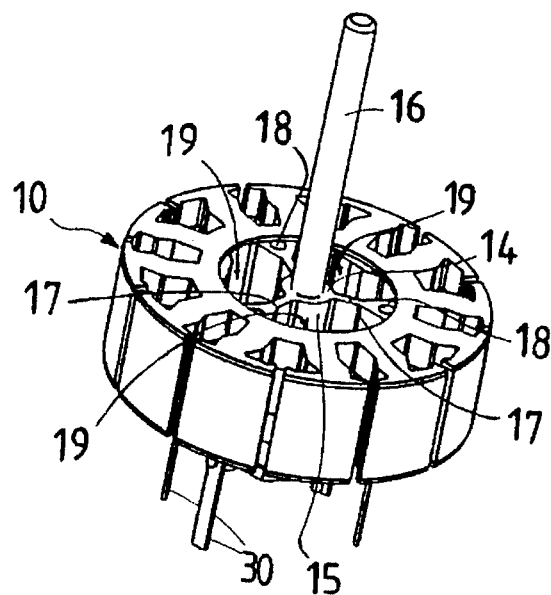
FIGS. 7 and 8 show the upper and lower faces of the stator of FIG. 1, respectively.
Figure 8:
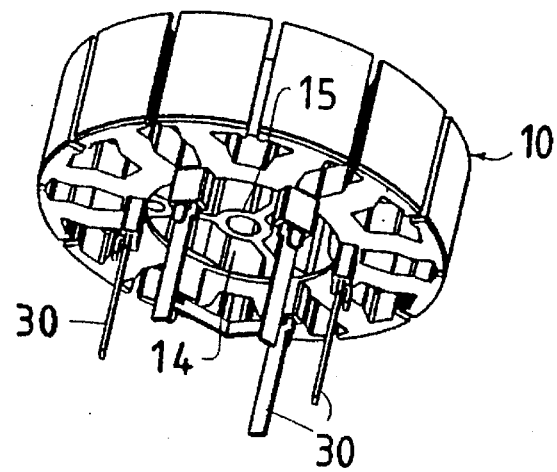

With reference to FIGS. 7 and 8, a fixed shaft 16 is force fitted in a seat 14 obtained in the center of the stator 10 during blanking. The shaft seat 14 comprises a plurality of radial walls 17 jointed to the stator 10. Proximate to the stator, the radial walls 17 form seats 18 for aggregating the laminations. The radial walls 17 divide the central cavity of the stator in a plurality of ventilation passages 19 for cooling the central part of the electric fan assembly.

Still with reference to FIG. 1, the central part of fan wheel 12 accommodates one or more bushings 46 for rotating on the fixed shaft 16 with the fan wheel 12 in order to reduce rolling friction between the relatively rotating parts. In the presently illustrated example an upper bushing and a lower bushing are provided.

The winding leads 30 are attached to the lower face of the stator (FIG. 8). The leads, in form of axial tongues, extend downwardly so as to cross the central part of the die-cast end shield bearing 60 and connect to a printed circuit supporting plate described herein after.

Figure 9:
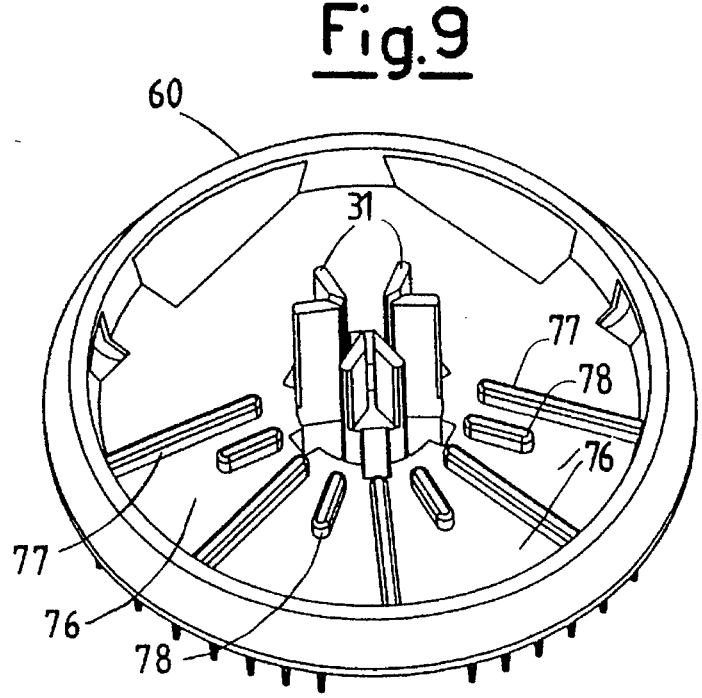
FIG. 9 illustrates the upper face of the stator bearing.
Figure 10:
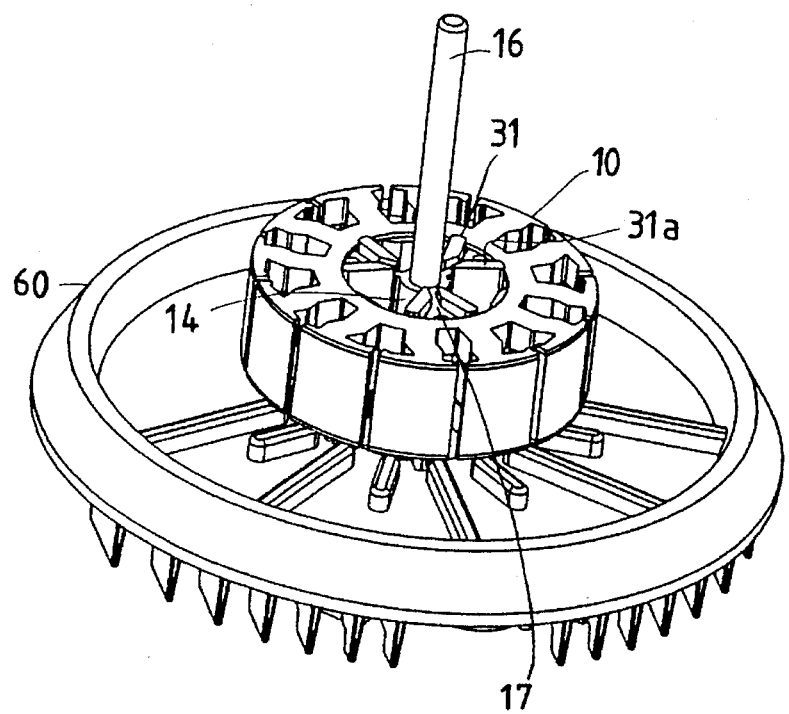
FIG. 10 shows the stator mounted to its bearing.

Referring to FIG. 9, bearing 60 consists of a die-cast body, preferably disc shaped. A plurality of axial fins 31 extend from the center of the upper face of the bearing. Fins 31 are arranged in pairs converging towards the center of the bearing to provide thermal dissipation and means for locking to the stator. As shown in FIG. 10, the stator 10 in the complete arrangement of FIG. 7 is inserted on bearing 60 by introducing each of the radial walls 17 of the shaft seat 14 between the respective pairs of converging fins 31. As shown in FIG. 10, the height of converging fins 31 is slightly greater than that of radial walls 17, so that the upper faces 31a of the fins can be clinched over the walls 17 to retain the stator axially and simultaneously expand radially against the central cavity of the stator to fix its position on the die-cast bearing 60.

Figure 11:
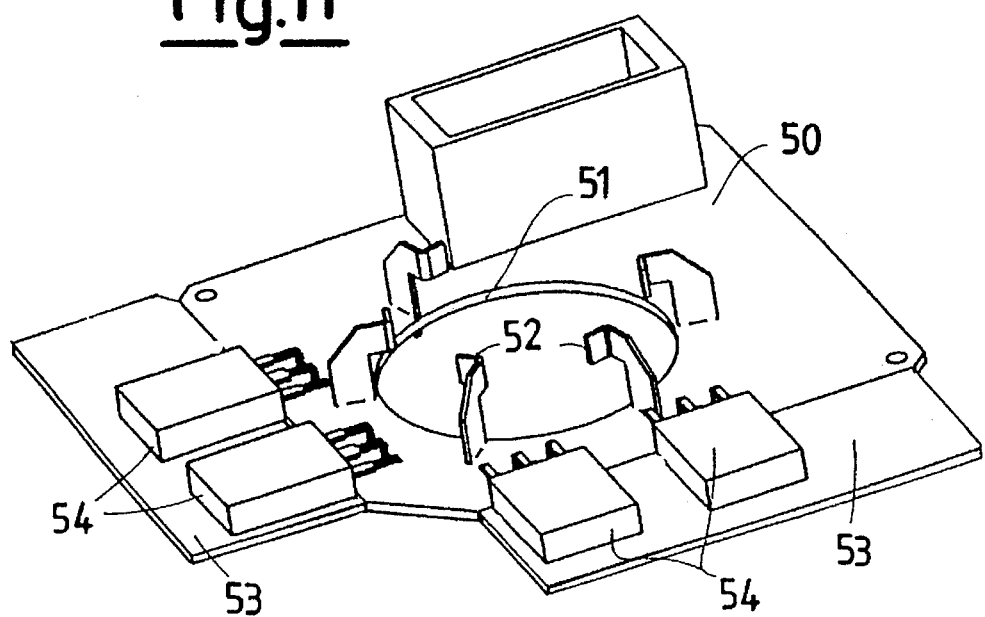
FIGS. 11 and 12 are perspective views of two different phases of the assembly of a card for supporting the printed circuit.

Referring to FIG. 11, numeral 50 designates a substantially rectangular plate for supporting the printed circuit. The plate has a central circular opening 51 about which a plurality of contacts 52 are disposed providing electric contact with the winding leads 30. Two punched tongues 53 are located on respective adjacent sides of plate 50. Each of the tongues 53 provides a resting plane for a pair of MOS 54 to be kept coplanar with plate 50 during flow soldering.

Figure 13:
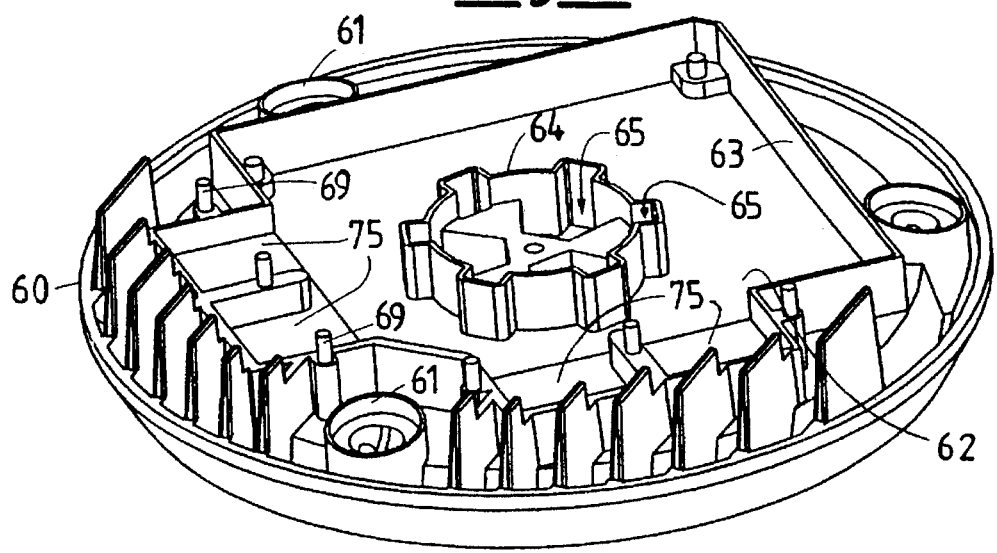
FIGS. 13 and 14 show the bottom of the bearing of the heater fan assembly stator in two subsequent mounting phases.

FIG. 13 is an upside-down view of the lower face of die-cast bearing 60. Bushings 61 are obtained on the periphery of said face to provide a rest on the lower half-shell, as will be described herein after.

Still on the lower face, bearing 60 forms a tank 62 delimited laterally by an outer wall 63 and an inner wall 64 so shaped as to provide a series of vertical channels 65 allowing ventilation and electric connection between the winding leads 30 and contacts 52 (FIG. 14) by electric projection welding.

Figure 12:
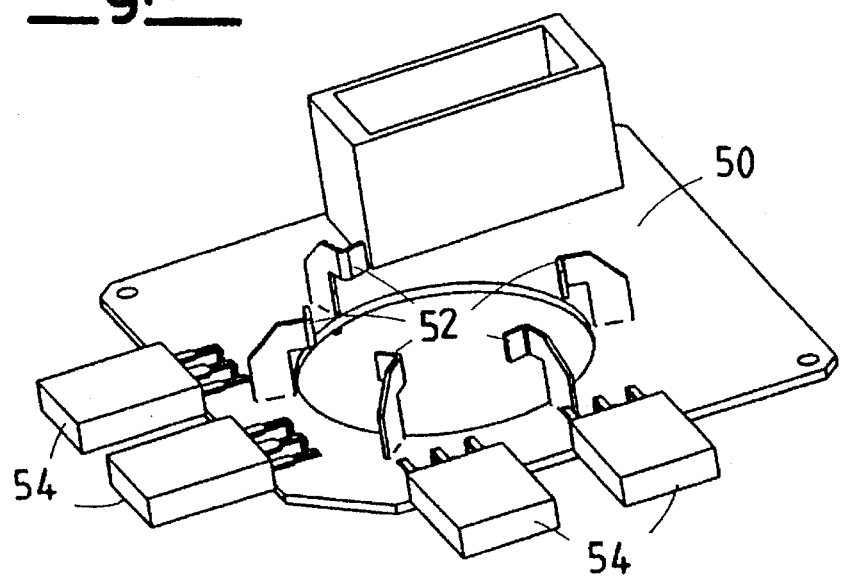
Figure 15:
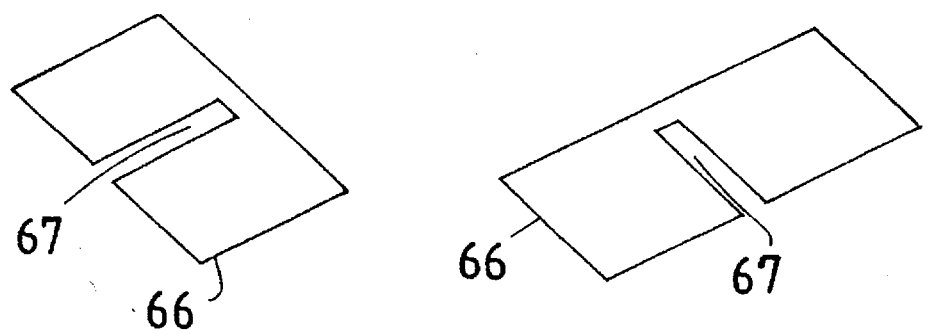

The shape of tank 62 is congruent with the assembly formed by the plate and the MOSs. In this way, upon preparing separately the plate with the MOSs, once the resting tongues 53 have been detached as shown in FIG. 12, the plate with the MOSs can be laid on the bottom of the tank. Two pairs of adjacent chambers 75 open towards the center are provided on two sides of the tank. Open chambers 75 are designed to accommodate the MOSs and provide a contacting surface which improves heat exchange to the MOSs and reduces the risk of perforating the insulation layer 66 (FIG. 15). Preferably, said surface is obtained by coining.

A thin layer of electric insulation 66 is laid on the bottom of each pair of adjacent chambers 75, as shown in FIG. 15. Layer 66 is rectangularly shaped with a side recess 67 to fit with median wall 68 dividing chambers 75. The simple shape of insulation layers 66 allows to reduce scraps considerably.

With an aim to facilitate the above cited coining operation without the risk of deforming or damaging any part of the bearing 60, as shown in FIG. 9, free zones 76 are provided on the upper face of the bearing, opposite to that having the chambers 75. Free zones 76 provide a steady rest to contrasting means used for coining chambers 75. Free zones 76 are obtained proximate to the periphery of the bearing between cooling fins 77, for example by forming shorter fins 78 alternately arranged with fins 77.

Figure 16:
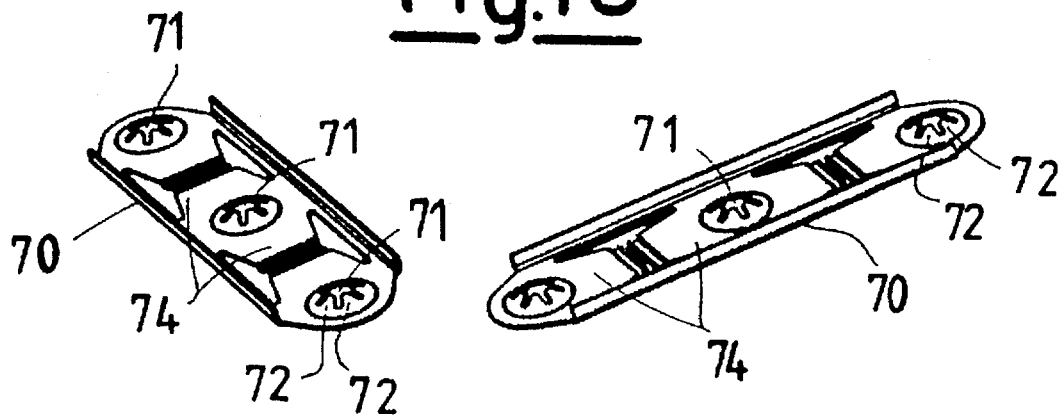
FIGS. 15 and 16 depict the electric insulators and the MOS locking members connected to the card of FIGS. 13 and 14.

In order to prevent the MOSs from detaching and to enhance heat exchange thereof, vertical pins 69 are obtained as a unit on the outer wall 63 of the tank at chambers 75. Retaining blades 70, separately illustrated in FIG. 16, are inserted on vertical pins 69. Each blade 70 comprises three spaced apart openings 71 having radial elastic tongues 72 for engaging on pins 69 and keeping the MOS in the correct position. Further, two additional elastic tongues 74 provide the MOSs with the correct pressure.

Figure 14:
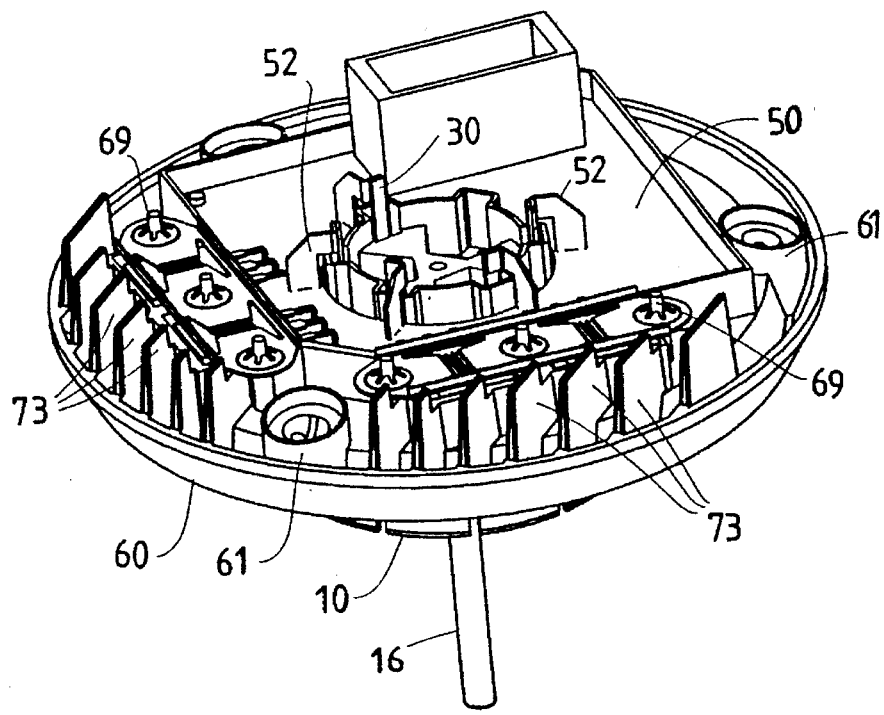

A solidifying resin can then be cast into the tank, submerging connections to the printed circuit completely (FIG. 14).

A plurality of cooling fins 73 formed on the lower face of bearing 60 at chambers 75 proximate to the MOSs. Cooling fins 73 are dissipate the heat of the MOS by conduction and convection and are oriented following the air circulation path acting thereupon.

Figure 2:
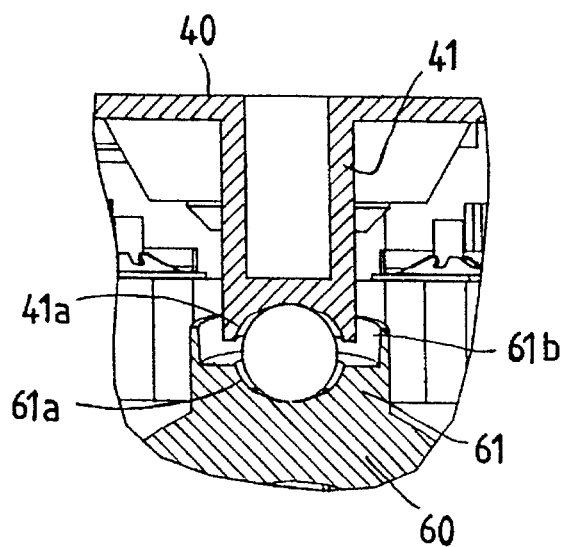
FIG. 2 is a sectional view to an enlarged scale taken along line II—II of FIG. 1.
Figure 17:
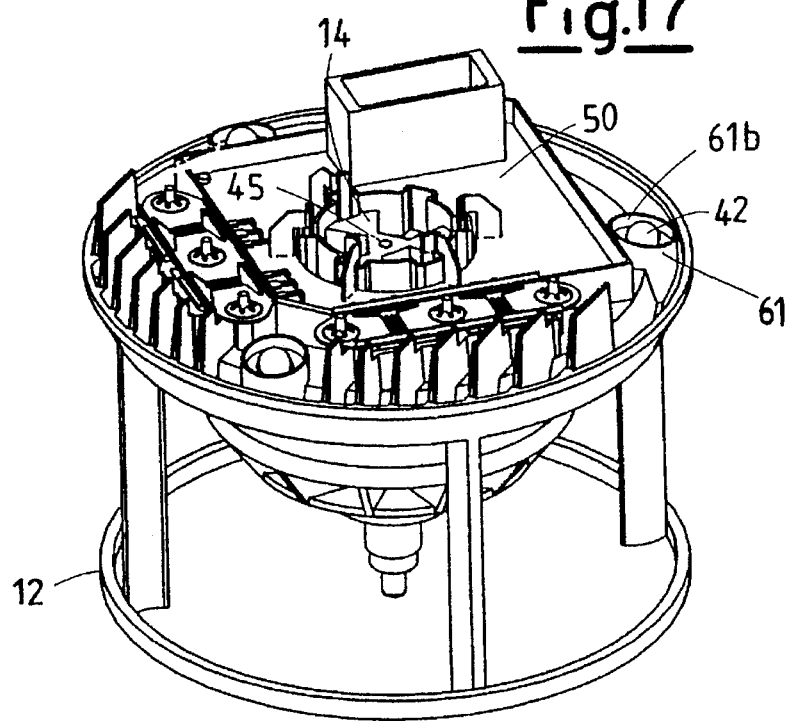
FIG. 17 is an overall perspective upside down view of the heater fan assembly.
Figure 18:
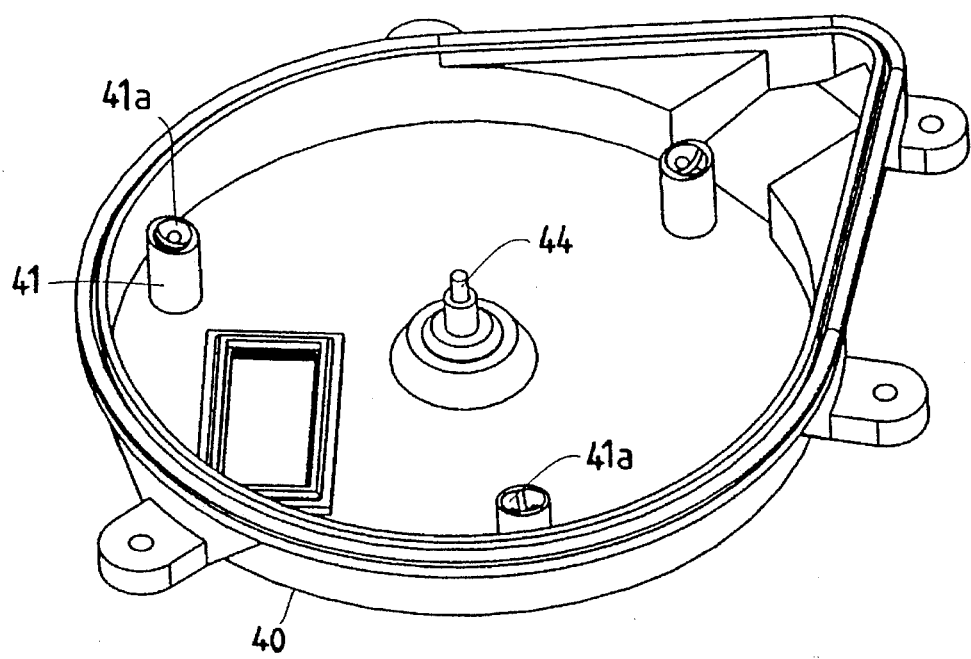
FIG. 18 is a view of the open shell to couple to the heater fan assembly of FIG. 17.

With reference to FIGS. 17, 18 and 2, the electric fan assembly comprising the stator, the rotor, the fan wheel and the plate (FIG. 17) is coupled to the open box 40 (FIG. 18) by interposing a sphere 42 of resiliently yieldable material between each bushing 61 of the die-cast bearing and a corresponding bushing 41 of box 40. Preferably, the spheres 42 are of elastomeric material. Bushings 41 and 61 have substantially ellipsoidal cavities 41a and 61a, respectively. Cavities 41a, 61a are circumferentially elongated to provide the bearing 60 with some degree of free rotational movement relative to the box 40. The radial curvature of cavities 41a, 61a is congruent with that of spheres 42. In addition, as shown in FIGS. 17 and 18, the facing surfaces of each pair of coupled bushings 41, 61 are parallel and inclined according to conical surfaces converging in the same direction (downwardly in FIG. 18). Each bushing 61 is provided with a security collar 61b for facilitating insertion of the spheres and guarantee correct positioning thereof.

The half-shell or open box 40 is centrally fixed to the bearing 60 by inserting a central pin 44 in a corresponding central bore 45 obtained in seat 14. The insertion length of the pin is selectable among a plurality of positions to adjust the pressure acting on the spheres. According to a preferred embodiment of the invention, pin 44 will consist of a screw or similar fastening member adapted for retaining members 40 and 60 together while allowing to adjust pressure on the elastically yieldable spheres.

The embodiment shown in FIG. 1 is particularly advantageous in dampening vibration tending to propagate also along pin 44. An annular body 47 of elastic material is interposed between pin 44 and the open box 40. As shown, elastic body 47 is inserted on an axially elongated tubular seat 49 which accommodates pin 44. Elastic body 47 is provided with an outer circumferential groove for coupling to a central portion 33 of box 40.

Being positioned on the central axis of null moment, pin 44 transmits no vibration. Moreover, in case of application to a motor having a non-vertical axis of rotation, pin 44 limits off-center movements between the fan wheel and the scroll.

After mounting members 40 and 60, the half-shell can be secured to the vehicle in known manner.

As will be apparent, the electric fan assembly according to the present invention besides eliminating the typical prior art problems discussed in the preamble of the description, provides the following advantages:

—the MOS can be directly soldered on the card;

—the card with relevant MOS are mounted to the stator bearing easily and correctly;

—heat exchange between the MOS and the die-cast bearing is improved;

—maximum protection is given to the printed circuit due to the tank being integral with the stator bearing and allowing total covering of the printed circuit connections with resin;

—the characteristics of the magnetic circuit are improved by eliminating the upper part of the conventional magnet supporting cap;

—improved cooling of the stator due to the peripheral and central cooling fins of the die-cast bearing;

—vibration dampening due to rubber members (the spheres) allowing angular movement of the electric fan assembly with respect to the open box housing;

—safer centering of the rotor due to the shaft being mounted directly on the stator lamination stack and elimination of accurate processing required by conventional motors having bushings fixed to the bearing.

While a specific embodiment of the electric fan assembly according to the invention has been disclosed, it is to be understood that such disclosure has been merely for the purpose of illustration and that the invention is not to be limited in any manner thereby. Various modifications will be apparent to those skilled in the art in view of the foregoing example. The scope of the invention is to be limited only by the appended claims.

We claim:

1. An electric fan assembly for a vehicle compartment, comprising:

an electric motor including a rotor to which a fan wheel is secured for rotation and a stator having a stack of laminations, the stator being mounted to a die-cast bearing fitted in an open box in communication with a scroll from which the fan wheel sucks air to be sent to the vehicle compartment;

a card including a printed circuit for determining operation of said electric motor;

wherein the bearing has two main opposite faces, one of which is a lower face and the other of which is an upper face, for mounting the stator and defining a seat for the assembly formed by the card;

a plurality of MOSs projecting from edges of the card, said MOSs being substantially coplanar to said card;

said seat having a depth dimensioned to receive a layer of solidifying resin covering and protecting the printed circuit and connections of the printed circuit;

said bearing having a plurality of central channels axially disposed along a cross-sectional axis of the die-cast bearing, the central channels providing electric connections between stator winding leads and a plurality of electric contacts located on the card proximate to at least one opening obtained in said card at said central channels; and a plurality of axial fins extending from the upper face of said bearing for engaging the stator axially and radially.

2. An electric fan assembly according to claim 1, wherein in a central part of the stator, there is obtained a central seat for locking and supporting a fixed shaft to which the rotor is rotatably mounted, said central seat comprising an array of longitudinal walls of pre-set height.

3. An electric fan assembly according to claim 2, wherein said axial fins of the bearing engage the longitudinal walls of the central seat.

4. An electric fan assembly according to claim 2, wherein a height of the axial fins exceeds that of the longitudinal walls a length allowing upper ends of the axial fins to be clinched to cover at least part of an upper face of the central seat to lock said central seat and said stator axially.

5. An electric fan assembly according to claim 4, wherein said axial fins are arranged converging in pairs towards a center of the central seat, each pair of the axial fins laterally engaging at least one of said longitudinal walls.

6. An electric fan assembly according to claim 1, wherein said seat comprises a peripheral axial wall and a central axial wall, said central axial wall encircling the central channels so as to contain the solidifying resin covering the card in a zone disposed within said peripheral and central axial walls.

7. An electric fan assembly according to claim 6, wherein said peripheral axial wall forms a plurality of peripheral chambers communicating with said seat, said peripheral chambers are adapted for accommodating said MOSs.

8. An electric fan assembly according to claim 7, wherein said peripheral chambers are disposed adjacent in pairs on two adjacent sides of said seat.

9. An electric fan assembly according to claim 8, wherein a plurality of cooling fins are formed on the lower face of the bearing adjacent to said peripheral chambers for dissipating heat of the MOSs, said cooling fins are oriented following a circulation path of cooling air.

10. An electric fan assembly according to claim 8, wherein a thin layer of electric insulating material is laid in each adjacent pair of the peripheral chambers, said electric insulating material is shaped to fit within said adjacent pair of the peripheral chambers.

11. An electric fan assembly according to claim 8, wherein substantially flat free zones are provided on the upper face of the bearing, opposite to a face having the peripheral chambers, in which said flat free zones provides a steady rest to means for coining said peripheral chambers.

12. An electric fan assembly according to claim 8, wherein at least two locking seats are provided on the peripheral axial wall of said seat at said peripheral chambers for locking the MOSs in position, corresponding quick locking means engaging on said locking seats to lock a MOS retaining blade.

13. An electric fan assembly according to claim 12, wherein said at least two locking seats include fixed vertical pins, said quick locking means including spaced apart apertures having elastic radial tongues.

14. An electric fan assembly according to claim 1, wherein the rotor comprises an outer rotor ring adapted for containing laterally at least one permanent magnet, said outer rotor ring is formed by a plurality of stacked annular laminations.

15. An electric fan assembly according to claim 14, wherein said stacked annular laminations forming the outer rotor ring are obtained from a peripheral part of the laminations constituting the stator.

16. An electric fan assembly according to claim 1, further comprising two detachable punched tongues, each of the two detachable punched tongues located on a respective side of two adjacent sides of said card, the each detachable tongue providing a resting plane for a pair of MOSs before insertion of the card in said seat.

17. An electric fan assembly according to claim 1, wherein the bearing is mounted on said open box by a securing system comprising:

an axial central constraint;

a plurality of peripheral elastic rests adapted for providing limited rotational movement of said bearing about said axial central constraint.

18. An electric fan assembly according to claim 17, wherein said axial central constraint is selectively adjustable according to a plurality of reciprocal axial positions between the bearing and the open box in order to adjust compression to said peripheral elastic rests.

19. An electric fan assembly according to claim 17, wherein said axial central constraint is formed by a threaded pin.

20. An electric fan assembly according to claim 17, wherein said axial central constraint between the bearing and the open box comprises a body of elastic material radially and axially interposed between said open box and said axial central constraint.

21. An electric fan assembly according to claim 17, wherein said elastic body is an annular member slipped on an axially elongated tubular seat for accommodating said axial central constraint, said elastic body having an outer circumferential groove for coupling to a central flange of said open box.

22. An electric fan assembly according to claim 17, wherein said peripheral elastic rests comprise:

a first series of concave seats of the bearing;

a second series of concave seats of the open box facing said first series of concave seats in operation;

a plurality of elastic members interposed between said first and second concave seats.

23. An electric fan assembly according to claim 22, wherein said elastic members are spheres of resiliently yieldable material.

24. An electric fan assembly according to claim 23, wherein said first and second concave seats are substantially ellipsoidal cavities having radial curvature congruent with that of said spheres elastic members and circumferential curvature greater than that of said spheres.

25. An electric fan assembly according to claim 22, wherein said first and second concave seats have edges disposed on conical surfaces converging towards a bottom of the open box.

* * * * *